(12) United States Patent
Robbins et al.

(10) Patent No.: US 7,397,464 B1
(45) Date of Patent: Jul. 8, 2008

(54) ASSOCIATING APPLICATION STATES WITH A PHYSICAL OBJECT

(75) Inventors: Daniel Chaim Robbins, Seattle, WA (US); Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 10/836,183

(22) Filed: Apr. 30, 2004

(51) Int. Cl.
*G09G 5/00* (2006.01)

(52) U.S. Cl. ........................................ 345/173; 345/156

(58) Field of Classification Search ......... 345/156–184, 345/719; 705/701; 463/30, 31; 715/719; 235/380

See application file for complete search history.

(56) References Cited

U.S. PATENT DOCUMENTS

| | | | | |
|---|---|---|---|---|
| 4,992,650 | A | 2/1991 | Somerville | 235/462 |
| 7,191,940 | B2 * | 3/2007 | Wilcox et al. | 235/380 |
| 2004/0066397 | A1 * | 4/2004 | Walker et al. | 345/719 |
| 2005/0156952 | A1 * | 7/2005 | Orner et al. | 345/905 |
| 2005/0202867 | A1 * | 9/2005 | Cok | 463/30 |
| 2005/0255913 | A1 * | 11/2005 | Cok | 463/31 |
| 2006/0125799 | A1 * | 6/2006 | Hillis et al. | 345/173 |
| 2006/0274046 | A1 * | 12/2006 | Hillis et al. | 345/173 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.
Bier, Stone, Pier, Buston, and DeRose. "Tooglass and Magic Lenses: The See-Through Interface." *Proceedings of Siggraph '93* (Anaheim, August). Computer Graphics Annual Conference Series, ACM, 1993, pp. 73-80. 8pp.
Blickenstorfer, Conrad H. "First Look: Acer TravelMate TM100 with Windows XP Tablet PC Edition." Pen Computing Magazine. Jul. 2002. pp. 44-47.

(Continued)

*Primary Examiner*—Nitin Patel
(74) *Attorney, Agent, or Firm*—Workman Nydegger

(57) ABSTRACT

An application state of a computer program is stored and associated with a physical object and can be subsequently retrieved when the physical object is detected adjacent to an interactive display surface. An identifying characteristic presented by the physical object, such as a reflective pattern applied to the object, is detected when the physical object is positioned on the interactive display surface. The user or the system can initiate a save of the application state. For example, the state of an electronic game using the interactive display surface can be saved. Attributes representative of the state are stored and associated with the identifying characteristic of the physical object. When the physical object is again placed on the interactive display surface, the physical object is detected based on its identifying characteristic, and the attributes representative of the state can be selectively retrieved and used to recreate the state of the application.

40 Claims, 9 Drawing Sheets

OTHER PUBLICATIONS

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser—rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceedings of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptual User Interactes (PUI'97)*, 1997. 3pp.

Rekimoto and Nagao. "The World through the Computer: Computer Augmented Interaction with Real World Environments." *Proceedings of UIST'95*. 1995. pp. 29 -36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*. 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet. " *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalsteig, Encarnação, and Szalavári. "Using Transparent Props for Interaction With The Virtual Table." Presented at *1999 ACM Symposium on Interactive 3D Graphics (13DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. +Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Garning." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997 © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTER-ACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

ASSOCIATING APPLICATION STATES WITH A PHYSICAL OBJECT

FIELD OF THE INVENTION

The present invention generally pertains to a computing system having an interface surface operable to recognize objects in proximity to the interface surface, and, more specifically, to exploit the object recognition capability of the interface surface to store and retrieve states of applications executable on the computing system.

BACKGROUND OF THE INVENTION

Computer systems of nearly all levels of complexity need ways to store and retrieve projects, documents, game situations, and other application states. The importance of saving documents and files created using personal computers is so well understood that many applications include auto-save utilities to regularly back up files with which the user is working. As a result, even in the event of a power outage, a software failure, a system crash, or other type of system interruption, a user generally will not lose more than the few minutes of work that were performed since the last auto-save was executed.

Even the most simple computing systems provide a way to save data. For example, even cellular and personal communication systems (PCS) telephones that have built-in gaming software enable a user to save incomplete games for later retrieval and resumption. More sophisticated video games have evolved from requiring a user to write down an alphanumeric code to save a game, to providing memory card interfaces for this purpose, and, more recently, to include fixed disk drives in the game systems to save game states. Saving and retrieving are thus routine on computing systems of all types.

With the evolution of computing systems, the task of saving application states has become easier. Not long ago, to save a file or other application state, a user had to remember the specific function key or other key string that should be pressed to initiate a save command. The advent of graphical user interfaces and menu-driven software has simplified the save process for users. Users no longer have to remember specific key combinations to initiate the save command; instead, users can employ a mouse or other pointing device they might be using to choose the "File" menu from the menu bars at the top of their screens, and choose a "Save" option to save their application states.

Further evolution of the computer system exploits computer vision technology to facilitate human-machine interaction. For example, the MIT Media Lab, as reported by Brygg Ullmer and Hiroshi Ishii in "The metaDESK: Models and Prototypes for Tangible User Interfaces," *Proceedings of UIST* 10/1997:14-17," has developed another form of "keyboardless" machine interface. The metaDESK includes a generally planar graphical surface that not only displays computing system output, but also receives user input by recognizing pattern-encoded objects placed against the graphical surface. The graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of the objects placed on the graphical surface.

Similarly, papers published by Jun Rekimoto of the Sony Computer Science Laboratory, Inc., and associates describe a "HoloWall" and a "HoloTable" that use IR light to detect objects. It should be noted that the papers describing the "HoloWall" and "HoloTable" generally are silent regarding the details and process used for detecting objects based upon the IR light reflected from the object.

Examples of other methods and systems for detecting and responding to objects placed on or near a graphical surface are used in inventions owned by the assignee of the present application. These inventions are described in co-pending U.S. patent applications for application Ser. No. 10/813,855 entitled "Template Matching On Interactive Surface," application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," all of which were filed on Mar. 31, 2004.

Although inventions such as the metaDESK and the other inventions previously listed respond to objects on the graphical display surface, it is significant that the metaDESK's response is to the contemporaneous placement and movement of the objects. There is no indication in the published literature that the metaDESK can associate temporal states of an application with an object placed on its graphical display surface or how such associations might be achieved. Clearly, it would be desirable to provide such an association, to enable application states to more conveniently be saved and subsequently recalled from storage.

Using the human-machine interfaces previously described, moving one's hands or other physical objects on or near to the graphical surface may replace keyboards, pointing devices, and other more conventional input devices. Nonetheless, the inception of such human-machine interfaces has not eliminated the need to save and retrieve files, documents, and application states. Thus, it would be desirable to provide a comparably intuitive, user-friendly manner to use such graphical surfaces to save and retrieve application states in association with objects that are detected on the graphical surface.

SUMMARY OF THE INVENTION

One of the advantages of the present invention is that it provides a simple and efficient way to save and retrieve one or more states of a computer application. States of the application are associated with a physical object allowing one or more states to be saved and/or retrieved by using the physical object. The physical object is not itself a storage medium, but merely presents an association with which state information is stored.

One aspect of the present invention is thus directed to a method for associating a state of a computer application with a physical object on an interactive display surface of a computer system. An identifying characteristic presented by the physical object is read when the physical object is disposed adjacent to the interactive display surface. When an indication is received that the state is to be saved, attributes representative of the state are stored in data storage not contained in the physical object. The attributes representative of the state are associated with the identifying characteristic, allowing the state to be later retrieved using the physical object.

Another aspect of the present invention uses an infrared-readable identifier disposed on a surface of the physical object. The identifier is read by transmitting infrared light through the interactive display surface toward a face of the interactive display surface where the physical object is disposed and recognizing the identifier by measuring an intensity of infrared light reflected by the identifier presented by the physical object.

A further aspect of the present invention determines a position of the identifying characteristic relative to the interactive display surface and associates the attributes representative of the state with both the identifying characteristic and the position of the identifying characteristic. The position of the identifying characteristic includes at least one of a location of the physical object and an orientation of the physical object. Also, whether a state is to be associated with the physical object can be determined by whether the physical object is placed or located within a region of the interactive display surface designated for state association with the physical object.

In accordance with another aspect of the present invention, the indication to store the state includes one of a command presented by a user or a process initiated by the computer system. A command presented by a user suitably includes one of actuating a physical button on the physical object causing a save command identifier to be presented to the computing system, actuating a physical button on the computing system, selecting a virtual button presented on the interactive display surface, moving the physical object in a designated save pattern, making a gesture associated with the save command, and removing the physical object from position adjacent to the interactive display surface.

Further, the attributes representative of the state are stored in either a local storage device directly coupled with the computer system or in a remote storage device coupled with a server accessible by the computer system.

States of applications are associable with more than one physical object. Thus, further aspects of the present invention provide for reading a second identifying characteristic presented by a second physical object when the second physical object is disposed adjacent to the interactive display surface and associating the attributes representative of the state with both the identifying characteristic and the second identifying characteristic. Also, a position of the identifying characteristic and a position of the second identifying characteristic relative to the interactive display surface can be determined, and the attributes representative of the state are associated with a combination of the identifying characteristic, the position of the identifying characteristic, the second identifying characteristic, and the position of the second identifying characteristic. Thus, the physical object may be associated with a first user of a multi-user application, while the second physical object is associated with a second user of the multi-user application, such that the state is a common state of interaction with the multi-user application by both the first user and the second user.

When a state is associated with a physical object, in accordance with additional aspects of the present invention, state information is retrievable using the physical object. The identifying characteristic presented by the physical object is read when the physical object is disposed adjacent to the interactive display surface. When an indication is received to retrieve a state associated with the physical object, the attributes representative of the state associated with the identifying characteristic are retrieved and then processed to recreate the state. If more than one state is associated with the physical object, the position of the identifying characteristic is read when the physical object is disposed in the position adjacent to the interactive display surface and a plurality of states associated with both the identifying characteristic and each position of the characteristic are presented. Upon receiving a selection of an indicated state from among the plurality of states, the indicated state is selected. Each of the plurality of states is represented by at least one of an assigned number, an assigned name, an assigned icon, and a view of the indicated state.

Another aspect of the present invention allows the physical object to present a plurality of identifying characteristics. In one form of the invention, each of the identifying characteristics is presented by a separate face of the physical object. Thus, each of the plurality of identifying characteristics is selectable by disposing the face presenting a chosen identifying characteristic adjacent to the interactive display surface.

Additional embodiments of the present invention provide for retrieval of state information from a physical object with which state information already is associated. Other embodiments of the present invention provide for systems having an interactive display, a projector, a surface, a light source, and a light sensor to read and respond to characteristics to associate state information with a physical object and retrieve the state information associated with the physical object.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
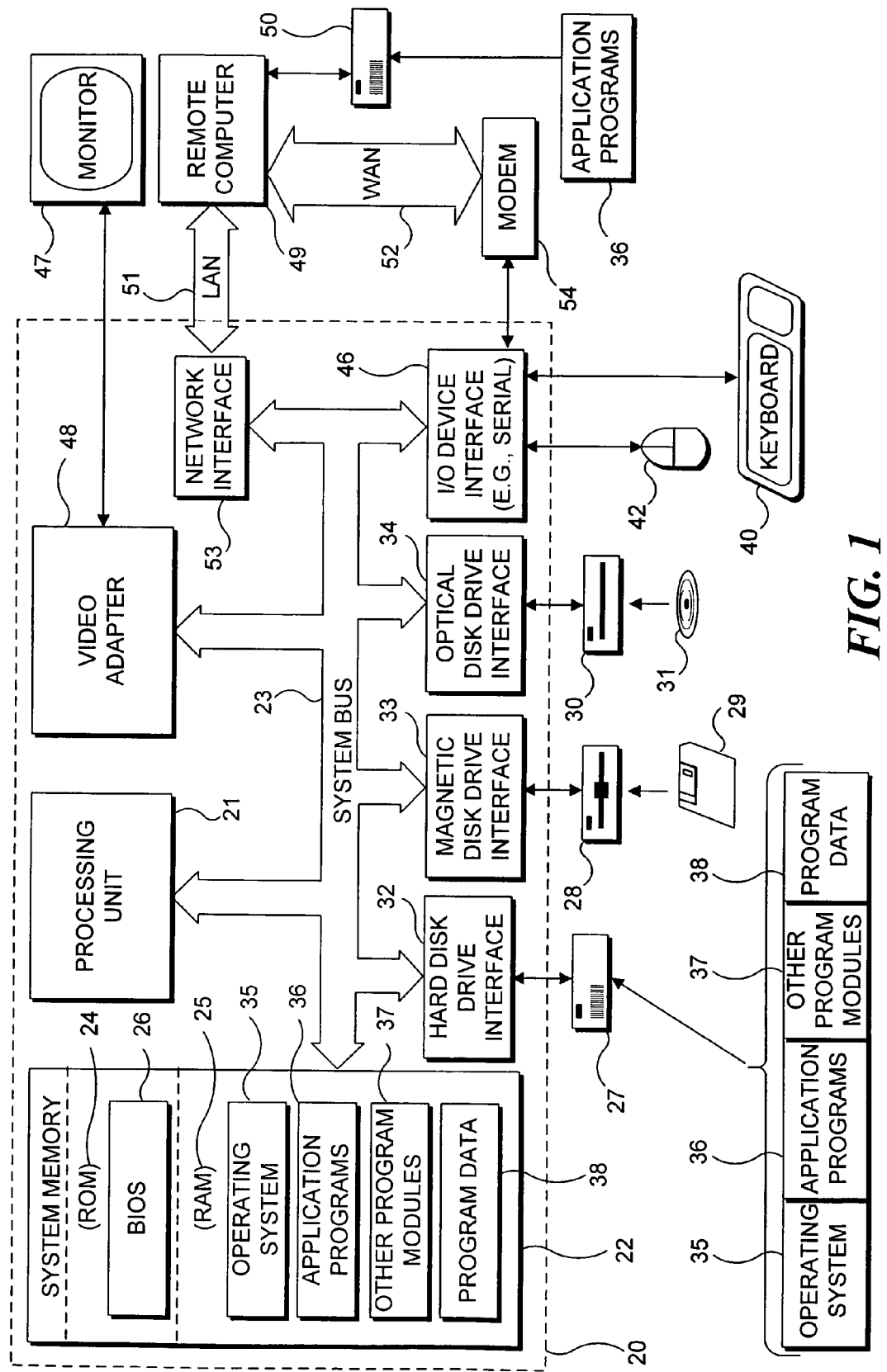
FIG. 1 is a functional block diagram of a generally conventional computing device or personal computer (PC) that is suitable for image processing for the interactive table as used in practicing the present invention.

FIG. 1 is a functional block diagram of an exemplary system suitable for implementing various portions of the present invention. The system includes a general purpose computing device in the form of a conventional PC 20, provided with a processing unit 21, a system memory 22, and a system bus 23. The system bus couples various system components including the system memory 22 to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. The hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for the PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk 27, magnetic disk 29, optical disk 31, ROM 24, or RAM 25, including an operating system 35, one or more application programs 36, other program modules 37, and program data 38. A user may enter commands and information into the PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. As discussed below, the interactive display table can be yet another input/output device that is coupled to the PC. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, although use of the interactive display table with PC 20 will make monitor 47 generally unnecessary, since the interactive display surface of the table serves the function of a monitor and more. In addition to the monitor, PCs are often coupled to other peripheral output devices (not shown), such as speakers (through a sound card or other audio interface—not shown) and printers.

The present invention may be practiced on a single, standalone system, however, the PC 20 can also operate in a networked environment using logical connections to one or more remote computers, such as a remote computer 49. Remote computer 49 may be another PC, a server (which is typically generally configured much like the PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, the PC 20 is connected to the LAN 51 through a network interface or adapter 53. When used in a WAN networking environment, the PC 20 typically includes a modem 54, or other means such as a cable modem, Digital Subscriber Line (DSL) interface, or an Integrated Service Digital Network (ISDN) interface for establishing communications over WAN 52, such as the Internet. A modem 54, which may be internal or external, is connected to the system bus 23 or coupled to the bus via I/O device interface 46 such as a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Interactive Surface

Figure 2:
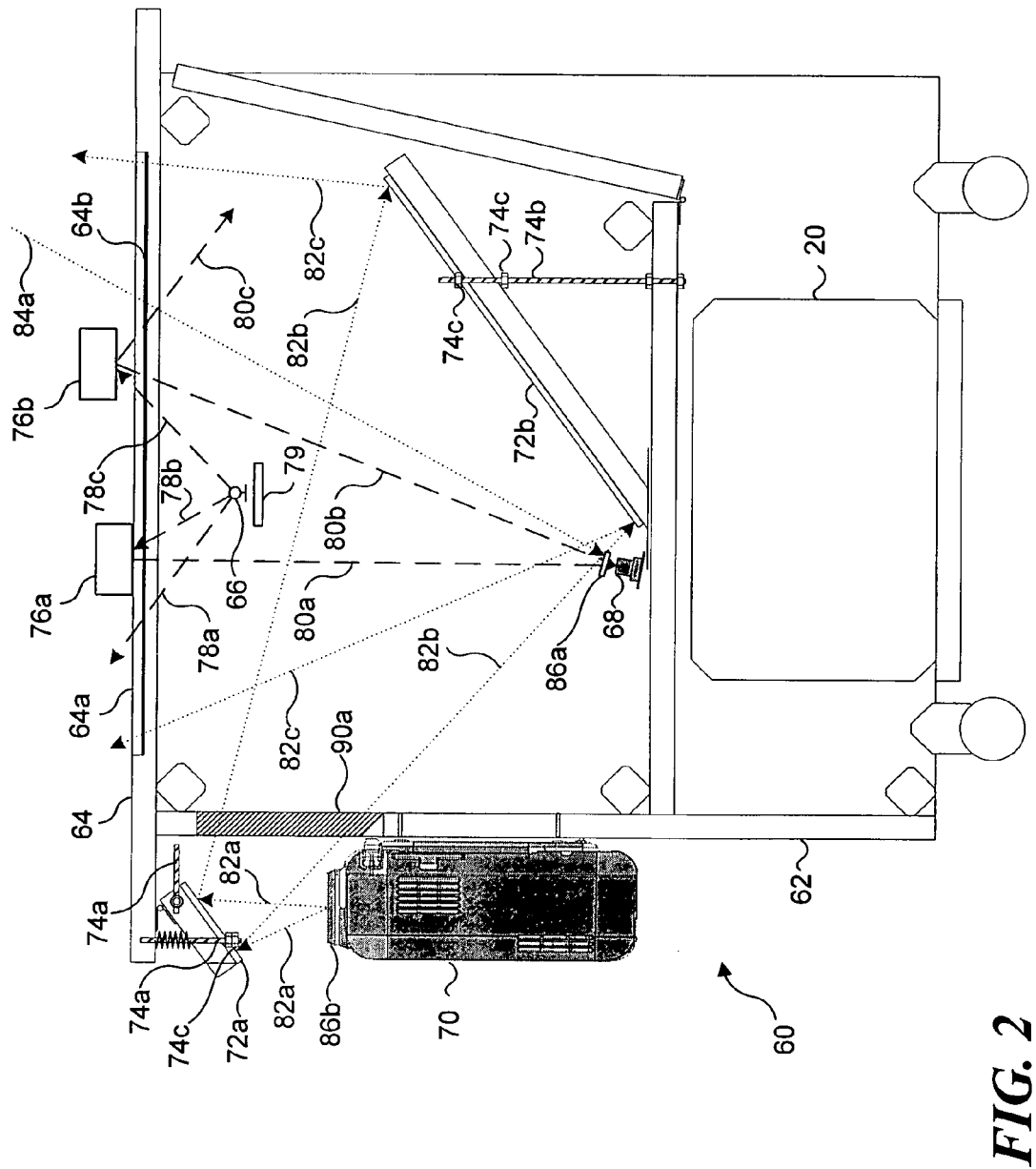
FIG. 2 is a cross-sectional view of the interactive table illustrating internal components.

In FIG. 2, an exemplary interactive display table 60 is shown that includes the PC 20 within a frame 62 and which serves as both an optical input and video display device for the computer. In this cut-away figure of the interactive display table 60, rays of light 82a-82c used for displaying text and graphic images are generally illustrated using dotted lines, while rays of infrared (IR) light used for sensing objects on or just above a display surface 64a of the interactive display table 60 are illustrated using dash lines. The display surface 64a is set within an upper surface 64 of interactive display table 60. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above the interactive display surface. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

- exit through the table surface without illuminating any objects, as indicated by dash line 78a;
- illuminate objects on the table surface, as indicated by dash line 78b; or
- illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. The digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display including ambient IR light that also travels along the path indicated by dotted line 84a.

IR light reflected from objects on or above the table surface may be:
 reflected back through translucent layer 64b, through IR pass filter 86a and into the lens of digital video camera 68, as indicated by dash lines 80a and 80b; or
 reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to display surface 64a will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to the PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

Embodiments of the present invention thus are operable to recognize an object and/or its position relative to the interactive display surface 64a by detecting and identifying its identifying characteristic's response to reflected IR light. The logical steps implemented to carry out an exemplary form of identifying one or more such identifying characteristics are explained in the commonly-assigned patent applications— application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference.

Figure 3:
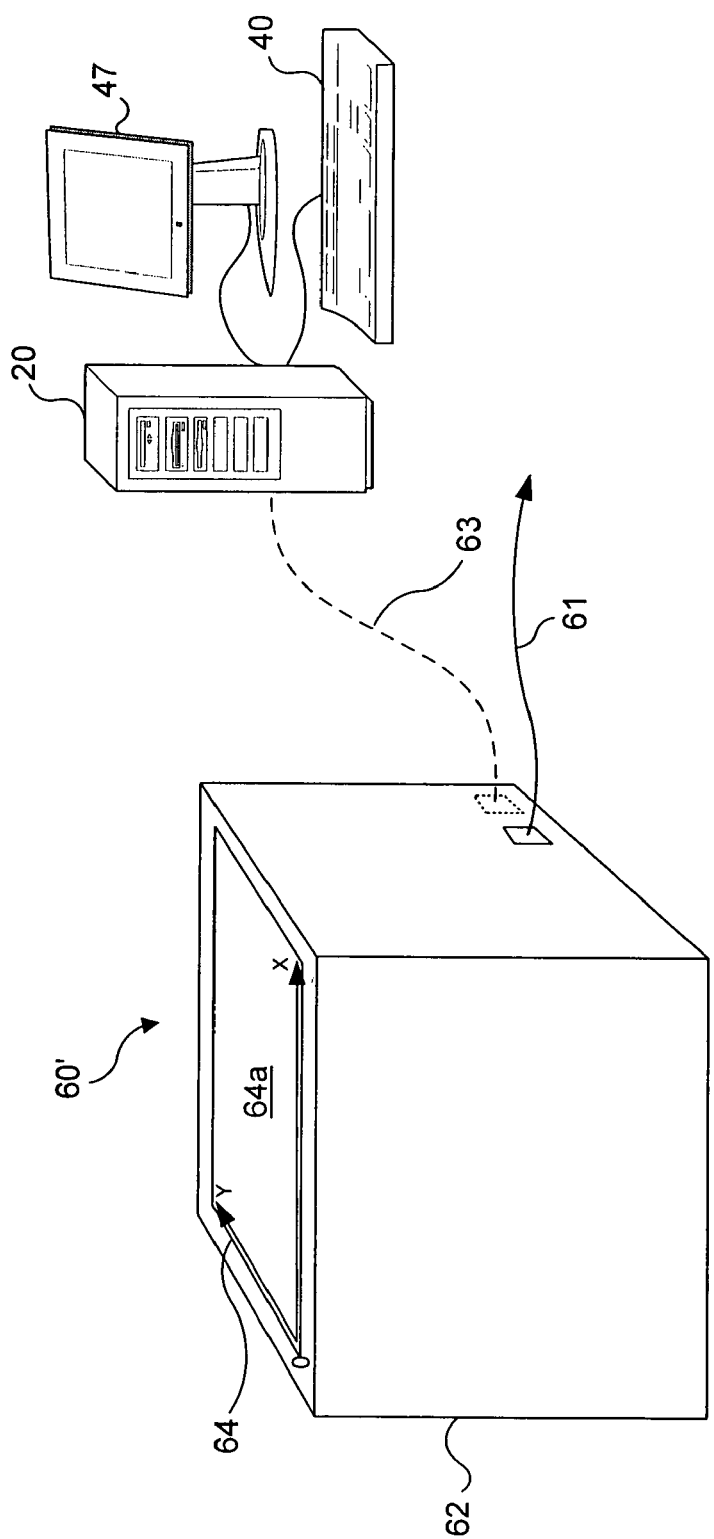
FIG. 3 is an isometric view of the interactive table.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on display surface 64a and identify objects that are resting atop the display surface, such as an object 76a, or are hovering just above it, such as an object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object (s) on or above display surface 64a. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Physical Object Association with Application States

Figure 4A:
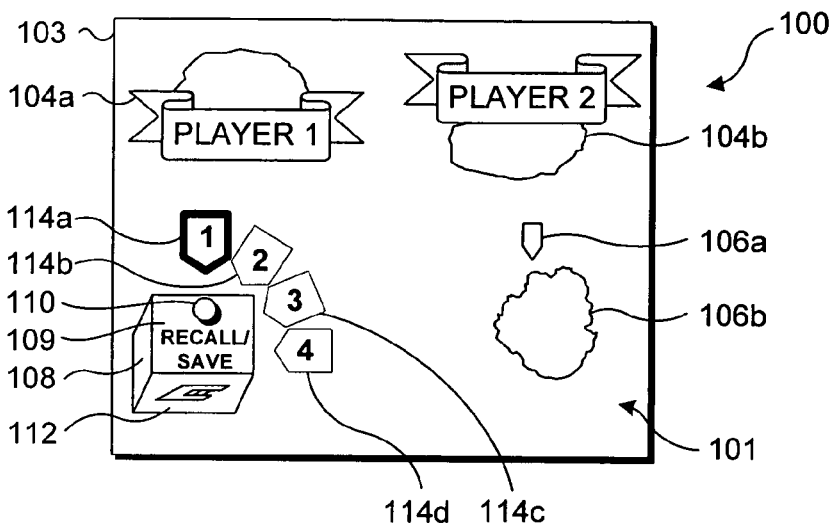
FIGS. 4A-4F are illustrations of the interactive display surface displaying virtual objects and interacting with at least one physical object.

In FIG. 4A, an illustration 100 shows an exemplary environment 101 of an interactive display surface 103 corresponding to one state of an application. Interactive display surface 103 supports interactive applications including, for one example, games. As previously described in connection with FIG. 2, environment 101 comprises a combined virtual and physical environment, including text and images generated by the associated computing system and physical objects placed on the interactive display surface.

In FIG. 4A, users are represented by icons 104a and 104b. The users may interact with each other through icons 104a and 104b and they also may interact with other icons 106a and 106b in environment 101. It will be appreciated that icons 104a, 104b, 106a, and 106b suitably include virtual icons generated by the associated computing system and physical objects placed on interactive display surface 103.

State information associated with an executing application suitably includes a wide range of information that a user may desire to save for later retrieval. Taking the example of the game, the state information may include current positions and trajectories of moving virtual objects. The state information similarly may include positions and movements of physical objects operating under program control, such as radio frequency (RF) controlled toy vehicles operating on the interactive display surface. Conditions such as a user's "energy," "health," "ammunition supply," "remaining lives," or similar data are storable for one or more players. In sum, any variable data associated with a current state of the application are storable so that the data can be retrieved to enable one or more users to resume the application at the same state of the game that was saved.

Environment 101 maintained by interactive display surface 103 responds to a physical object 108 being placed on the interactive display surface. Physical object 108 includes one or more identification codes recognizable by the IR recognition facilities of interactive display surface 103, as previously described in connection with display surface 64a of FIG. 2. Physical object 108 may include an IR-readable code on a base or bottom of the physical object. The physical object may include additional faces with a different IR-readable code disposed on each of one or more other faces. The IR-readable code may be a bar code or simply an IR-readable shape that is identifiable by the IR recognition facilities of the interactive display surface.

By having one or more different IR-readable codes disposed on each of a plurality of its faces, the physical object is associable with states of the application supporting environment 101 on interactive display surface 103. When physical object 108 includes multiple IR-readable codes on a plurality of faces, each of the IR-readable codes are associable with different states of environment 101. These different states may correspond to different temporal situations, different users, and/or other state-related information.

Physical object 108 is not a storage medium for the state information. State information is associated with the presence and/or position of physical object 108 on interactive display surface 103, but the state information is not stored in the physical object. Instead the state information is stored in the computing system associated with interactive display surface 103 or otherwise stored in a remote storage or by a remote computing device in communication with interactive display surface 103 accessible, for example, over a network. The physical object and its identifying characteristic are therefore associated with the stored state information, but physical object 108 does not contain the stored state information.

Also, although not shown in FIG. 4A, interactive display surface 103 may include a designated state association area in which physical object 108 can selectively be placed. A state association area may include a designated corner or edge of interactive display surface 103. As a result, the placement of a physical object 108, the physical object 108 presenting an IR-responsive characteristic such as an IR-readable identifier, in the designated area indicates that a state is to be associated with the identifier or other characteristic of the face of physical object 108. If placed in another area of the interactive display surface, physical object 108 may be associated with the application in another manner, such as being usable for controlling a parameter of the application, or physical object 108 may constitute a passive barrier or serve some other function in regard to the software application, or the physical object may serve no other purpose at all.

Operation of embodiment of the present invention is illustrated in FIGS. 4A-4F. In illustration 100 of FIG. 4A, physical object 108 is placed on interactive display surface 103 for the purpose of recalling a state of environment 101. Placement of physical object 108 on interactive display surface 103 may launch a particular application with which one or more states associated with the IR-readable characteristics presented by one or more faces of physical object 108 are associated, as well as call up the state associated with the physical object when the application is launched. For purposes of describing embodiments of the invention, it is assumed that one or more physical objects 108 each presenting one or more coded IR-readable identifiers are used to engage the interactive display surface 103. However, it will be appreciated that other physical objects 108 may present IR-readable characteristics resulting from their shapes or similar features.

As previously mentioned, physical object 108 potentially includes a plurality of faces, each of which may present a distinct IR-readable characteristics. In one embodiment of the present invention, a top face 109 is associated with an IR-readable code on an opposite, bottom face (not shown) of the physical object 108. Thus, as a user sees top face 109 facing upward from the interactive display surface, the associated IR-readable code on the opposite, bottom face (not shown) is adjacent interactive display surface 103, where the IR-readable code can be detected, read, and responded to by interactive display surface 103 and its associated computing system (which, hereinafter, is collectively referred to simply as interactive display surface 103, for sake of brevity). Physical object 108 shown in FIGS. 4A and 4B also has at least one additional face 112, facing to a side as the physical object is placed on the interactive display surface. Additional face 112 is opposite an additional IR-readable encoded face (not shown). Thus, IR-readable encoded faces for a plurality of different states, users, and/or other applications may be disposed on a single physical object 108.

In one embodiment of the present invention, when physical object 108 is placed on interactive display surface 103, the IR-readable code on the opposite, bottom face (not shown) is detected, read, and responded to by interface display surface 103. When the interactive display surface detects the IR-readable code, the interactive display surface generates a plurality of state indicators 114*a*-114*d*. Each of state indicators 114*a*-114*d* corresponds to an available, stored state that is associated with the IR-readable code disposed on the bottom face of physical object 108. More particularly, in the present example, state indicators 114*a*-114*d* show available, stored states associated with different rotational positions of physical object 108, as will be further described below.

Figure 4B:
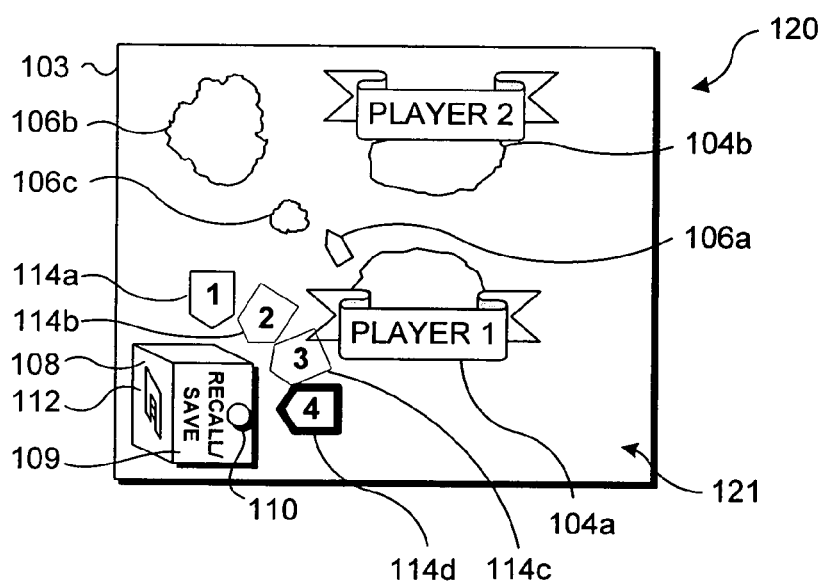

In FIGS. 4A and 4B, state indicators 114*a*-114*d* bear numbers corresponding with states "1" through "4," respectively, which are currently associated with physical object 108. It will be appreciated, however, that names, icons, or other information could be assigned to state indicators 114*a*-114*d* to represent the states associated with physical object 108 and, more particularly in this example, with different rotational positions of physical object 108.

As shown in illustration 100, interactive display surface 103 responds to a placement of physical object 108 relative to the interactive display surface. Responding to a position where physical object 108 was placed on the interactive display surface, state indicators 114*a*-114*d* are generated by interactive display surface 103 and arrayed around where the physical object is located. As previously mentioned, however, one or more specified portions of the interactive display surface 103 may be reserved for saving and/or retrieving states by interactive display surface 103 based upon the design of the software application being executed by interactive display surface 103.

As shown in illustration 100 of FIG. 4A and illustration 120 of FIG. 4B, interactive display surface 103 may be configured to respond not only to the location of the physical object, but also to its orientation. In illustration 100, physical object 108 is oriented in a specific orientation based upon the disposition and orientation of the words "RECALL/SAVE" on the upper face of the physical object. Corresponding to the orientation of the physical object 108, a first state indicator 114*a* for state "1" is highlighted to indicate a saved state corresponding to the upright orientation of the physical object shown in the illustration 100.

By contrast, illustration 120 of FIG. 4B shows a resulting environment 121 on interactive display surface 103 when the physical objected is rotated approximately ninety degrees clockwise, as will be evident from the orientation of the words "RECALL/SAVE" in this Figure. State indicators 114*a*-114*d* remain arrayed around the position of physical object 108. In illustration 120, however, while state indicator 114*a* for state "1" no longer is highlighted, state indicator 114*d* for state "4" now is highlighted. As also can be seen by comparing illustration 100 with illustration 120, environment 121 has changed from environment 101. Positions of player icons 104*a* and 104*b* are changed between environments 101 and 121 to reflect the different states stored in association with the different orientations of the physical object. Similarly, positions of icons 106*a* and 106*b* have changed in environment 121 to show how they, too, have changed in the state corresponding to the current orientation of physical object 108 in FIG. 4B. To even more clearly indicate the change between environments 101 and 121 associated with the changed positions of the physical object and the corresponding different states, icon 106*c* was not even present in environment 101 associated with the state "1" shown in FIG. 4A. However, as physical object 108 is rotated clockwise approximately ninety degrees, in new environment 121, icon 106*c* is now present.

It can be appreciated from illustrations 100 and 120 that rotating physical object 108 is analogous to turning a dial or a knob allowing a user to scroll through different stored states, each of which are associated with different generally distinct orientations of physical object 108. Rotating the physical object highlights one of a number of state indicators 114*a*-114*d* indicating the state being selected, as well as showing on interactive display surface 103 the state information or environment associated with the highlighted state indicator.

Figure 4C:
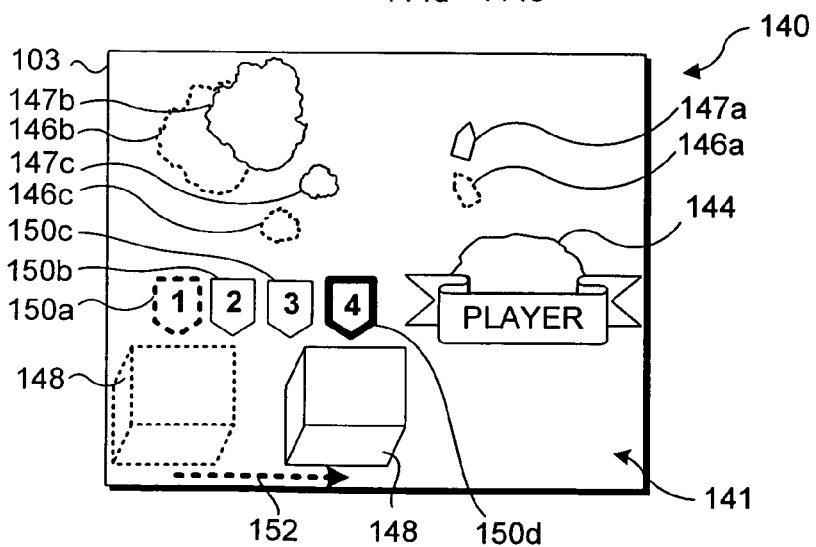

To exemplify one possible alternative embodiment of the present invention, Illustration 140 of FIG. 4C shows another environment 141 supported by interactive display surface 103. Environment 141 is a single-user or single-player environment. In addition, in environment 141, a state is selected by translating a physical object instead of rotating a physical object.

In environment 141, an icon 144 represents the user or player. Other icons 146*a*-146*c* represent icons associated with state "1" of environment 141. Available states are represented by state indicators 150*a*-150*d*, and state "1" is represented by a state indicator 150*a*. In contrast to state indicators 114*a*-114*d* of FIGS. 4A and 4B, state indicators 150*a*-150*d* are arranged linearly. To select from among the available states, physical object 148 is translated across interactive display surface 103 instead of being rotated as physical object 108 was rotated in FIGS. 4A and 4B. Translation of physical object 148 is shown in illustration 140 by arro 152.

As physical object 148 is translated from a position adjacent to state indicator 150*a* representing state "1" to a position adjacent to state indicator 150*d* representing state "2," a number of changes take place in environment 141. Icons 146*a*-146*c* with which the user may interact in environment 141 are replaced with icons 147*a*-147*c* to show what changes have occurred with regard to icons 147*a*-147*c* between state "1" and state "4." Also, state indicator 150*d* is highlighted to show that the user currently has positioned physical object 148 to select state "4."

It should be appreciated that indicating a state may involve a combination of translating physical object 148 across interactive display surface in one or two dimensions as well as rotating physical object 148. Furthermore, state indicators such as state 150*a*-150*d* could alternatively be arrayed in triangular, square, rectangular, or other geometrical patterns indicating physical object 148 should be moved in a corresponding direction to select from among available states.

As a further alternative, placement of a physical object on interactive display surface may link to multiple sets of state information, but selection of a particular set may be made in other ways. For example, placement of physical object on interactive display surface may result in a menu being presented from which one of a plurality of states may be chosen using real or virtual buttons, or other known approaches for selecting an item from a menu.

Whether state information is recalled from or saved to each of the represented states is controllable in a number of ways. In the embodiment shown in illustrations 100 and 120 of FIGS. 4A and 4B, respectively, a button 110 on top face 109 of physical object 108 controls retrieval and/or storage. In one embodiment of the present invention, physical object 108 is IR-translucent or IR-partially transparent, and button 110 keys a plunger that causes an IR-readable code to be brought into contact with the bottom surface of the physical object 108 where it can be read by the interactive display surface. The state information associated with selected state indicator 114a-114d is suitably recalled with a single or short press of button 110. By contrast, to save the displayed state information in association with selected state indicator 114a-114d, button 110 is pressed multiple times, e.g., twice in succession, or the button is pressed and held for at least a predefined time. Alternatively, physical object 148 of FIG. 4C does not include a button like button 109 of physical object 108 of FIGS. 4A and 4C. Accordingly, "tapping" interactive display surface 103 with physical object 148 a specified number of times may indicate user wishes to save or retrieve a particular state.

Embodiments of the present invention are not limited to using a partially IR-transparent physical object and plunger or tapping the interactive display surface with the physical object as just described. Placement of physical object 108 on interactive display surface 103 at predefined locations may initiate either the function of saving or the function of retrieving state information. Alternatively, placing physical object 108 on interactive display surface 103, followed by moving the physical object in a predefined pattern across the interactive display surface may trigger saving or retrieval of state information. In addition, button 110 on the physical object may not operate a plunger, but instead, may cause an RF signal, an IR or other light source to be at least briefly energized, or another signal to be activated to which interactive display surface 103 is configured to appropriately respond by saving or retrieving state information.

Selecting whether to save or retrieve the state information also can be accomplished by pressing designated keys or selecting items from menus displayed on interactive display surface 103 or by otherwise selecting recall or save commands on the associated computer system.

Figure 4D:
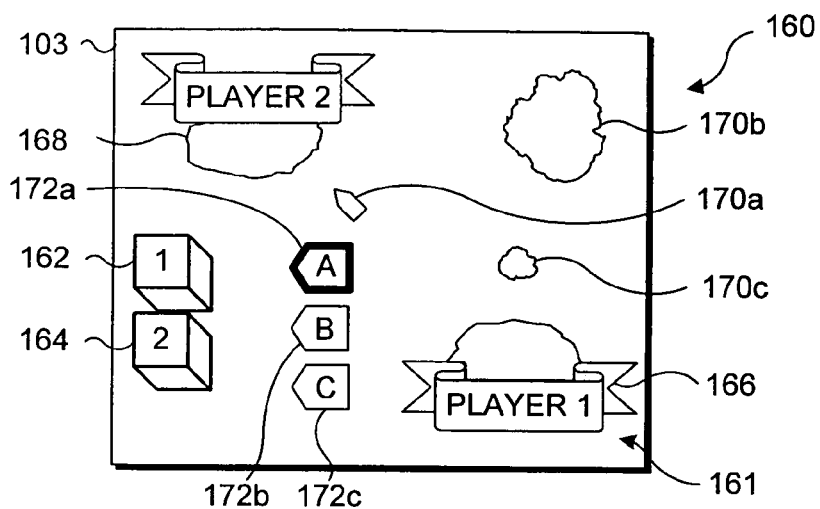
Figure 4E:
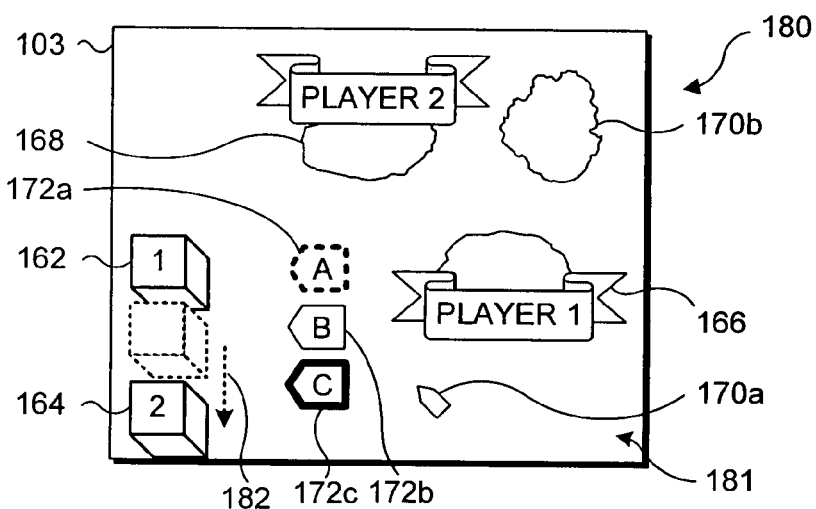
Figure 4F:
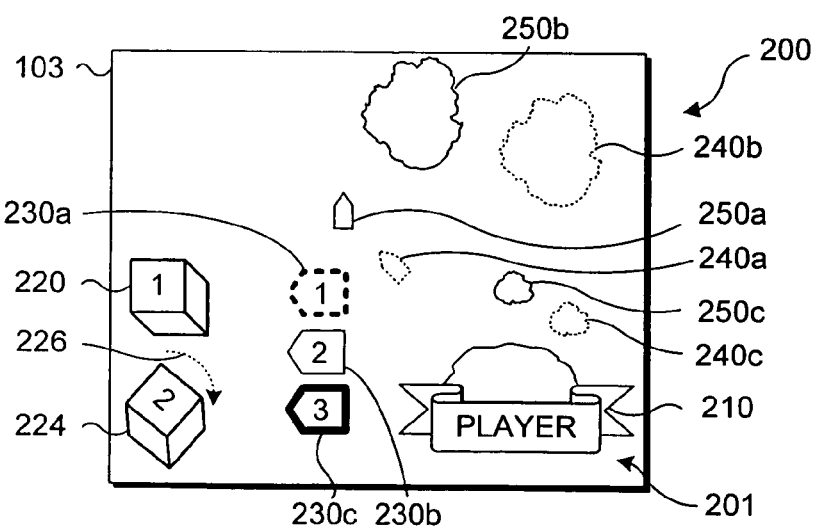

Embodiments of the present invention are not limited to use of a single physical object for storing state information. FIGS. 4D-4F illustrate how a plurality of physical objects may be used for saving and retrieving states shared by a plurality of users, as well as how a plurality of physical objects may be used to facilitate saving and retrieving states for a single user.

Illustration 160 of FIG. 4D shows another environment 161 in which there are two physical objects 162 and 164 representing states associated with two users, represented by icons 166 and 168, respectively. Each of physical objects 162 and 164 may present one or more identifying characteristics on faces as previously described in connection with FIG. 4A.

It is desirable in many applications to have separate state associations for separate users. For example, if a number of users interact with an interactive display surface, presence or absence of physical objects with which each user's attributes are associated makes for a convenient way to indicate the users who are present. Further, the environment 161 may include a role-playing game in which each user's persona possesses unique powers, has completed specified feats, or manifests various identity attributes, such as an appearance or a name that the user wishes to maintain, perhaps if the game is played again by that player with other different players. Associating the properties of each user's persona or individual state with individual user objects enables users to maintain desired attributes with different interactive display surfaces 103. Alternatively, in games where players may have their own confidential data, such as cards in a virtual card game or board game, letter tiles in a SCRABBLES game, and similar applications, users will desire to keep their data confidential and stored only in association with their own respective physical objects 162 and 164, until the game is resumed.

As described in the case of environments 101 and 121, in environment 161 of illustration 160, application states can be stored and/or retrieved via their association with physical objects 162 and 164. Icons 166 and 168 representing the players and/or other icons 170a-170c are associable with states that can be stored or recalled in association with the characteristics presented by physical objects 162 and 164. Multiple states may be commonly associated with physical objects 162 and 164, as represented by state indicators 172a-172c. As in the case of illustrations 100 and 120 of FIGS. 4A and 4B, by moving one or both physical objects 162 and 164, users may select one of state indicators 172a-172c with which currently generated state information will be stored and from which the state information can recalled. State indicator 172a representing state "A" is highlighted indicating it is presently selected by positions of physical objects 162 and 164. It should be noted that states can be represented by numbers, as previously described in FIGS. 4A-4C, by letters, by names, icons, or by other representations. To select among different states associated with physical objects 162 and 164, a user moves one or both of physical objects 162 and 164 to indicate another state.

Illustration 180 of FIG. 4E shows an environment 181 similar to that of environment 161 of FIG. 4E except that physical object 164 has been moved as indicated by arrow 182 to indicate another state. Movement of physical object 164 to a new position causes state indicator 172c representing state "C" to be highlighted indicating that positions of physical objects 162 and 164 presently indicate that state "C" is selected. As previously described, physical objects 162 and 164 may moved by translation, rotation, or a combination of the two to indicate selection of another state.

As previously described, movement of one of physical objects 162 and 164 to indicate a new state may cause attributes of the currently selected state to be selected. Attributes of currently-selected state "C" are reflected in movements of player icons 166 and 168 and other situation icons 170a-170c.

It should be noted that use of multiple physical objects to represent states may be used in cases involving a single user as well as in multi-user/multi-player situations. Attributes of a number of states or a state having a number of variations may be associated with a single physical object while a second physical object may be used to select or vary the state or states associated with the first physical object.

Illustration 200 of FIG. 4F shows an environment 200 in which a single user engages an environment 201 supported by the interactive display surface. The single user is represented by icon 210. User employs physical objects 220 and 224 for association of state information. For example, there are three states represented by state indicators 230a-230c associated with physical object 220. A user manipulates a second physical object 224, in this example, by rotating second physical object 224 as shown by arrow 226 to select among states. Rotating second physical object 224 to indicate a different choice of state once again causes icons 240a-240c associated with an initial state, such as state "1," to be replaced with icons

250a-250c showing how the attributes of the state change with selection of state "3." Numerous states may be associated with physical object 220 that can be indicated by pairing physical object 220 with a second physical object, such as physical object 224, and manipulating second physical object 224 to choose different states or otherwise vary state attributes.

Creating Associations

Figure 5:
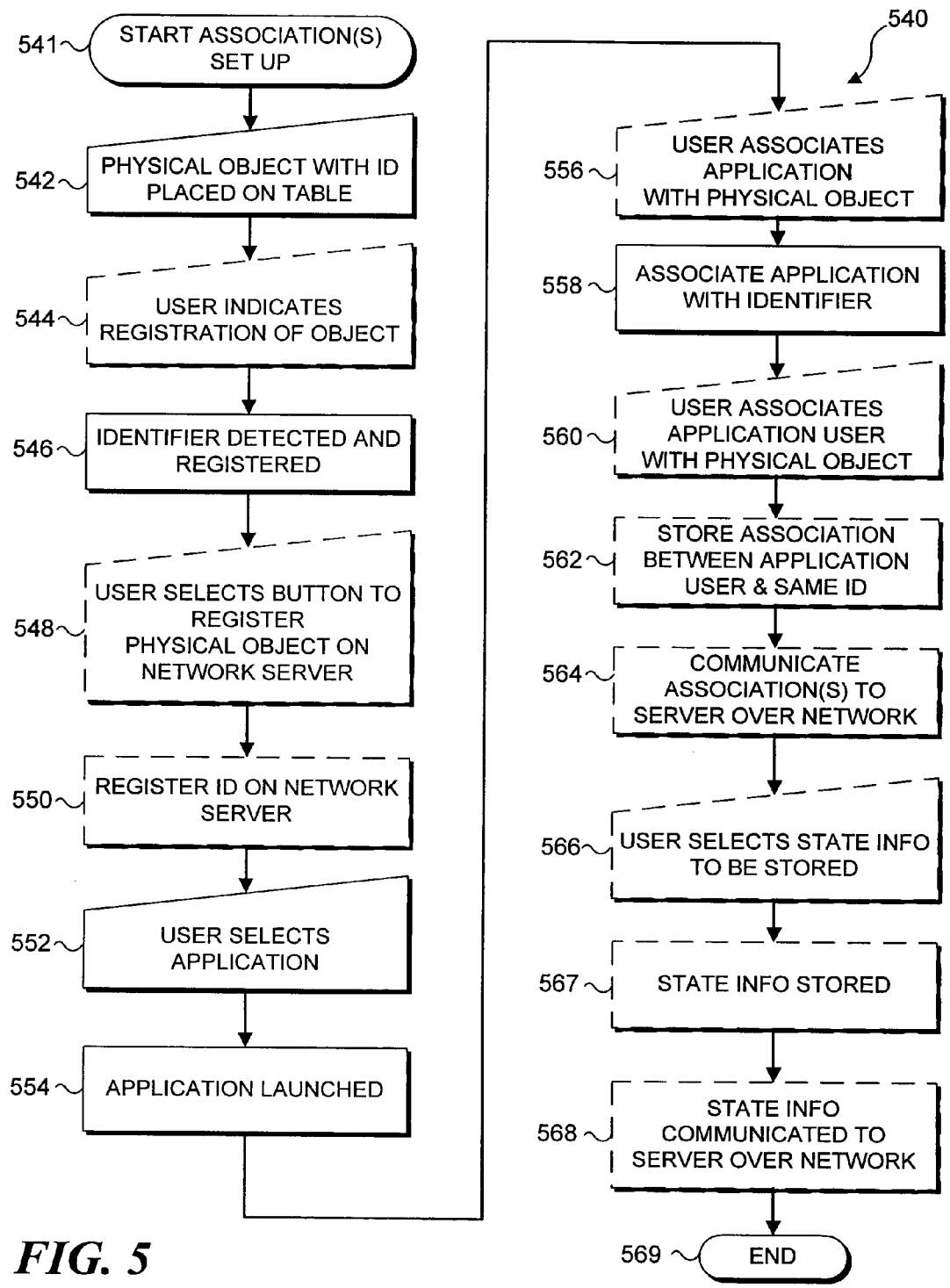
FIG. 5 is a flow diagram illustrating the logical steps for associating information with a physical object.

FIG. 5 illustrates a routine 540 for establishing associations between physical objects and state information corresponding to environments supported by the interactive display surface. Exemplary routine 540 includes steps for registering an identifier (or other characteristic) associated with a physical object, associating state information with the identifier, and optionally associating other information with the identifier.

Routine 540 for creating associations with a physical object begins at a step 541. At a step 542, a user places a physical object presenting an identifier on the interactive display surface. Upon being placed on the interactive display surface, the identifier is then read. In one embodiment of the present invention, placement of the object on the interactive display surface does not automatically register the identifier presented by the physical object. By not automatically registering the identifier, for example, the user is given a chance to confirm or agree to the registration. Thus, in the event that the physical object presenting the identifier was placed on an interactive display surface in error, the user is given a chance to correct the mistake. In such an embodiment, at a step 544, a user then selects a registration button associated with the interactive display surface to communicate to the interactive display surface that the object is to be registered. At a step 546, the interactive display surface then detects and registers the currently generated state information with the identifier on the physical object.

Alternatively, simply placing the physical object on the interactive display surface is sufficient to cause the identifier disposed on the physical object to be registered. In this embodiment, at step 546, the interactive display surface detects the identifier on the physical object and registers the identifier so that the identifier is usable for association with state information.

In an optional step 548, a user directs the interactive display surface to register the identifier for the physical object on a server, over a network. A user initiates this optional step by pressing a real or virtual button, choosing a menu selection, making a predefined gesture with the physical object (or with another object, including the user's finger or hand) over the interactive display surface, or performing a comparable act. Once the user directs the interactive display surface to register the identifier associated with the physical object at a step 550, the identifier of the physical object is then registered on the server. Alternatively, the interactive display surface can automatically register the identifier on the server when the identifier is registered with the interface display surface. Once the identifier is registered on the server, information that becomes associated with the identifier is then accessible from other interactive display surfaces in communication with the server over the network. By registering with the server, a user can take the physical object to an interactive display surface at a friend's house and recall state information that may be centrally stored for the user by placing the physical object on the friend's interactive display surface.

In a step 552, a user presses real or virtual buttons, uses a menu, or undertakes another step at the interactive display surface to access an application. The application may be a local application associated with an interactive display surface or a network-based application accessible through an interface coupled to the interactive display surface (or external PC 20). At a step 554, the application is launched. Once the application is launched, at a step 556, the user can choose to direct the interactive display surface to associate the physical object with the application. Association can be performed by the user by actuating either a physical button or a virtual button that is generated by the interactive display surface, performing a designated gesture such as dragging or otherwise moving a finger or other object, choosing a menu option, or performing a similar predefined task. A user can thus manually associate the application with the identifier presented by the object, or the interactive surface table can automatically associate the identifier with the application if the physical object presenting the identifier is placed or left on the interactive display surface after the application has been launched. At a step 558, the application is associated with the identifier presented by the physical object. Accordingly, the object now can be used to store application-related information with the identifier presented by the physical object.

Alternatively, the physical object need not be associated with a particular application, and the identifier presented by the physical object can be associable with a plurality of applications (or none, but still be associable with a state of an application that is running). As a further alternative, an interactive display surface is configurable to enable a user to associate an identifier with an application by choosing an application to be associated with the identifier without actually launching the application.

At an optional step 560, the identifier presented by the physical object can be associated with an individual user. If the identifier presented by the physical object is selected to be associated with a particular user, at a step 560, the user information is associated with the identifier. At a step 562, the association between an application user and the physical object identifier is stored. A unique association of a user with a particular identifier presented by a physical object may be useful in multi-player games or collaborative applications that support a plurality of uniquely identified users. If there are a number of users—a number which potentially is very large in a networked environment—associating an individual user with the identifier presented by the physical object expedites subsequent user identification to the system. The user need only present the physical object previously associated with the user, so that the identifier is detected by the interactive display surface. In an optional step 564, the interactive display surface communicates the association of the user with the identifier presented by the physical object, to permit the user to be identified by the physical object at other locations (e.g., on other interactive display surfaces) within the network.

Once the optional registration of the object and association of the object with a user and an application are completed, at an optional step 566, a user directs how application state information is to be associated with the physical object. As previously described in connection with FIGS. 4A-4C, a physical object placed on the graphical display surface is associable with one or more states of an application allowing application states to be stored or recalled from a computing system and/or server coupled in communication with the interactive display surface.

In a preferred embodiment of the present invention, at optional step 566, a user associates an application state with the object by moving the physical object to a position that will be representative of the state to be associated. The user then associates the state with that position by making a gesture with the physical object or actuating a physical or virtual control. A suitable gesture includes pressing down on the physical object, sliding the object in a predetermined manner, lifting the physical object off the interactive display surface, or effecting another prescribed gesture. Actuating a physical button includes pressing a button on the physical object such as button 110 described in connection with FIGS. 4A and 4B or another button associated with the physical object. Alternatively, the interactive display surface may include one or more buttons to make the association, or a button on a computing system associated with the interactive display surface may be pressed. A virtual button may include a menu choice displayed on the interactive display surface or another type of virtual button presented by the interactive display surface.

It also should be noted that an indication to store and associate the state information need not be made by the user, but can be made by the application or another element of the interactive display surface and its associated computer system. For example, the application or the system may be programmed to periodically and automatically save the application state in the event of a system crash, power outage, or other interruption. As previously described, auto-save processes are known to those skilled in the art, but not in connection with an association to a physical object, as in this invention.

In one embodiment of the present invention as previously mentioned, the user also may be prompted to provide state-identifying information for the saved state, such as a state name, or the user may be provided with a list of icons that are selectively associable with the saved state. Alternatively, the date and/or time describing when the state information may be associated with the state information to facilitate subsequent selection of a desired state.

Once the user acts to select the state information at optional step 566, at an optional step 567, the state information is stored in association with the physical object and/or its position. The state information is stored, at least temporarily, locally in a computing system associated with the interactive display surface. The physical object represents an association with the stored state information; the state information is not stored in the physical object itself. Once the state information is stored, at an optional step 568, the state information is communicated over a network to a server, thereby potentially allowing the physical object to be used to retrieve the stored state information from another interactive display surface or other system coupled over the network with the server. Routine 540 ends at a step 569.

State Access and Retrieval

Figure 6:
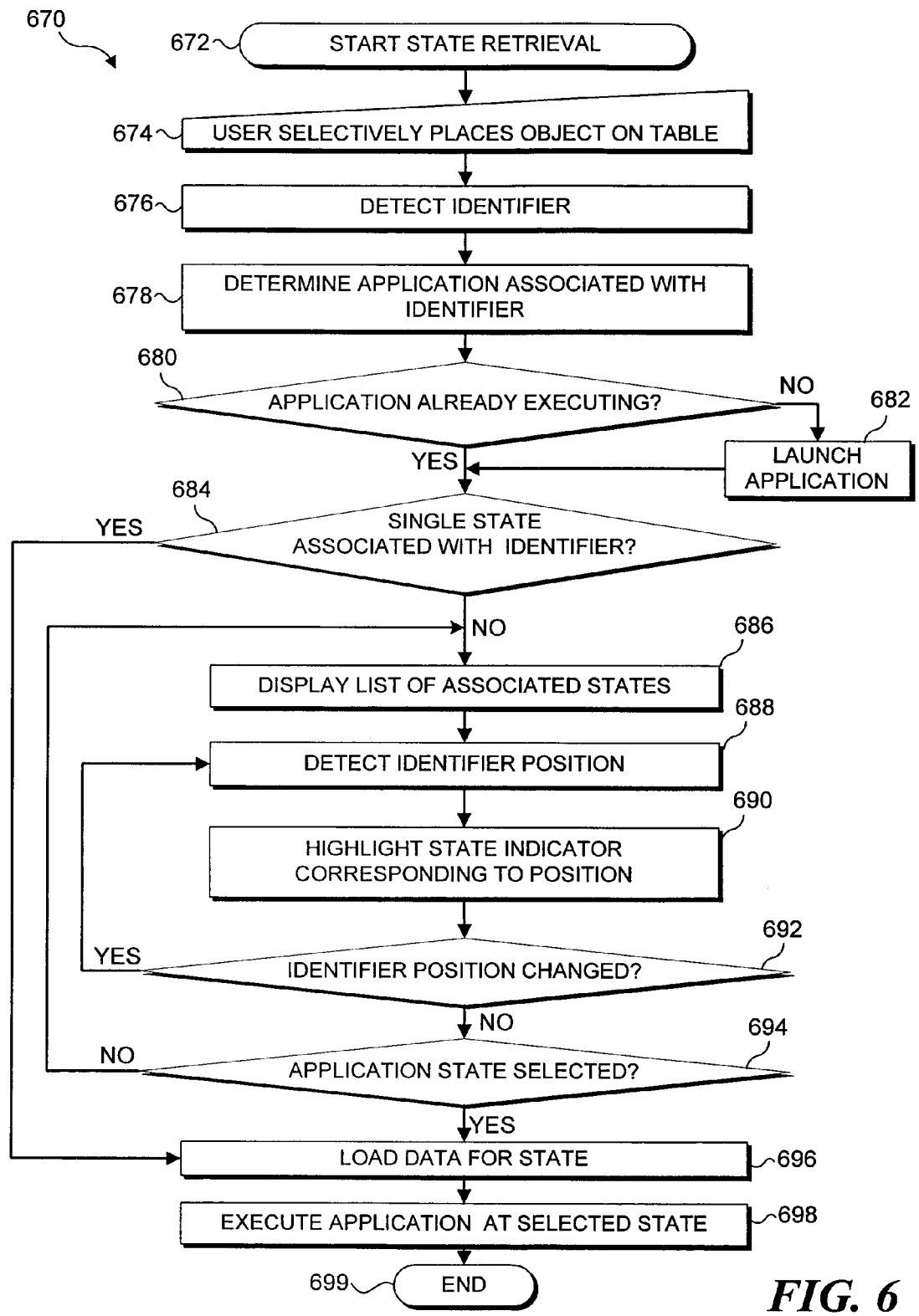
FIG. 6 is a flow diagram illustrating the logical steps for recalling information previously associated with a physical object.

Once a physical object bearing an identifier is registered on an interactive display surface or network and potentially associated with a user and/or an application on the interactive display surface or the network, the physical object can then be used to retrieve the application states. FIG. 6 is a flowchart of an exemplary routine 670 for retrieving the application state. Routine 670 begins at a step 672. At a step 674, a user selectively places a physical object on the interactive display surface. If the physical object has more than one face bearing an IR-readable identifier, the identifier disposed on each face may be associated with separate users, applications, and/or states. Thus, if the physical object includes multiple identifiers, each on a different face, the user will have to select the identifier by determine the face that is presented to the interactive display surface.

As a further part of step 674, a location on the interactive display surface and/or an orientation of the physical object may be associated with different information. For example, the interactive display surface may include a prescribed area for retrieving information, an area for retrieving information as opposed to saving information, for retrieving information for a first user distinct from an area for a second user, and/or other designated sections. Also for example, as described in connection with FIGS. 4A and 4B, an orientation of the physical object and, therefore, of the identifier presented by the physical object, can represent different states or potentially link to other different information. Thus, when selectively placing the physical object on the interactive display surface, the user not only selects what association-bearing physical object and what face of the association-bearing physical object to place on the interactive display surface, but how to position the physical object on the interactive display surface to achieve the desired result.

Once the physical object is selectively placed on the interactive display surface at step 674, at a step 676, the identifier is detected by the interactive display surface. Exemplary processes and systems for detecting the identifier, as well as a position and/or orientation of the identifier, are described in the co-pending, commonly-assigned U.S. patent application Ser. No. 10/814,577 entitled "Identification Of Object On Interactive Display Surface By Identifying Coded Pattern," filed on Mar. 31, 2004. The process and system disclosed in this referenced application are hereby specifically incorporated herein by reference.

At a step 678, an application associated with the identifier is determined. As part of the application determination at step 678, in a preferred embodiment of the present invention, the identifier can be evaluated for its suitability. For example, once the application associated with the identifier is determined, if the associated application is unavailable on the interactive display surface, the user can be informed of this situation. Also, if another application already being executed is expecting an object associated with it to be placed on the table, the interactive display surface may communicate to the user that the physical object—or the selected face of the physical object—placed on the interactive display surface is not suitable. Alternatively, if the user associated with the physical object is not authorized to use the application or to access the interactive display surface, the physical object can be rejected, for purposes of security, parental control, resource control, and for other reasons.

Assuming the identifier and its associated application are acceptable, at a decision step 680, it is determined if the application associated with the identifier already is executing. If not, at a step 682, the application is launched.

Once it is determined at decision step 680 that the application already is running, or the application is launched at step 682, routine 670 proceeds to a step 684, where it is determined if there is only one state associated with the identifier. If so, it is assumed that the single associated state is the state that should be loaded. Accordingly, routine 670 proceeds to a step 696, where information associated with the state is loaded.

On the other hand, if it is determined at decision step 684 that there is more than one state associated with the identifier, at a step 686, a list of available states associated with the identifier is displayed. For example, as shown in illustration 100 of FIG. 4A, a number of state indicators 114a-114d are displayed to indicate that a plurality of associated states in connection with the physical object are available to be recalled. Although illustration 100 only shows state numbers, it should be appreciated that other state-identifying information, such as state names, representative icons, or dates and/or times of association suitably are presented to facilitate the user's choice of a state, as described above.

Also as previously described in connection with FIGS. 4A and 4B, one of a number of available states is selectable by moving the physical object bearing the identifier. Accordingly, at a step 688, a position of the identifier is detected as described in the above-referenced co-pending patent application Ser. No. 10/814,577 entitled "Identification Of Object On Interactive Display Surface By Identifying Coded Pattern," filed Mar. 31, 2004. As the physical object is rotated, slid, or otherwise moved to indicate a particular state is selected, at a step 690, the state indicator corresponding to a current position of the identifier is highlighted to indicate to the user the state currently selected. For example, in illustration 100 of FIG. 4A, state indicator 114a is highlighted to correspond with the position of physical object 108 indicating a desired state. Similarly, in illustration 120 of FIG. 4B, as the orientation of physical object 108 is changed, state indicator 114a is no longer highlighted but one of state indicators 114b-114d is highlighted to correspond with the orientation of the physical object.

At a decision step 692, it is determined if the position of the physical object and, thus, the position of the identifier has been changed to indicate that the user intends to select a state other than that whose state indicator was highlighted at step 690. If so, routine 670 loops to step 688 to once more detect the position of the identifier. On the other hand, if it is determined at decision step 692 that the position of the identifier has not been changed, routine 670 proceeds to a decision step 694 to determine if a state has been selected. As previously described, a state may be selected by actuating a physical button on the physical object or on the interactive display surface, by selecting a virtual button presented by the interactive display surface, by making a predefined gesture with one's finger or the physical object relative to the interactive display surface, or in another comparable way.

If it is determined at decision step 694 that a state has not been selected, routine 670 loops to step 686, where the list of associated states continues to be displayed. On the other hand, if it is determined at decision step 694 that a state has been selected, routine 670 proceeds to a step 696, where data associated with the state are loaded. Once data associated with the state are loaded at step 696, the application commences execution at the selected state using the associated state data as shown in a step 698. Routine 670 then ends at a step 699.

State Association/Object Removal

Figure 7:
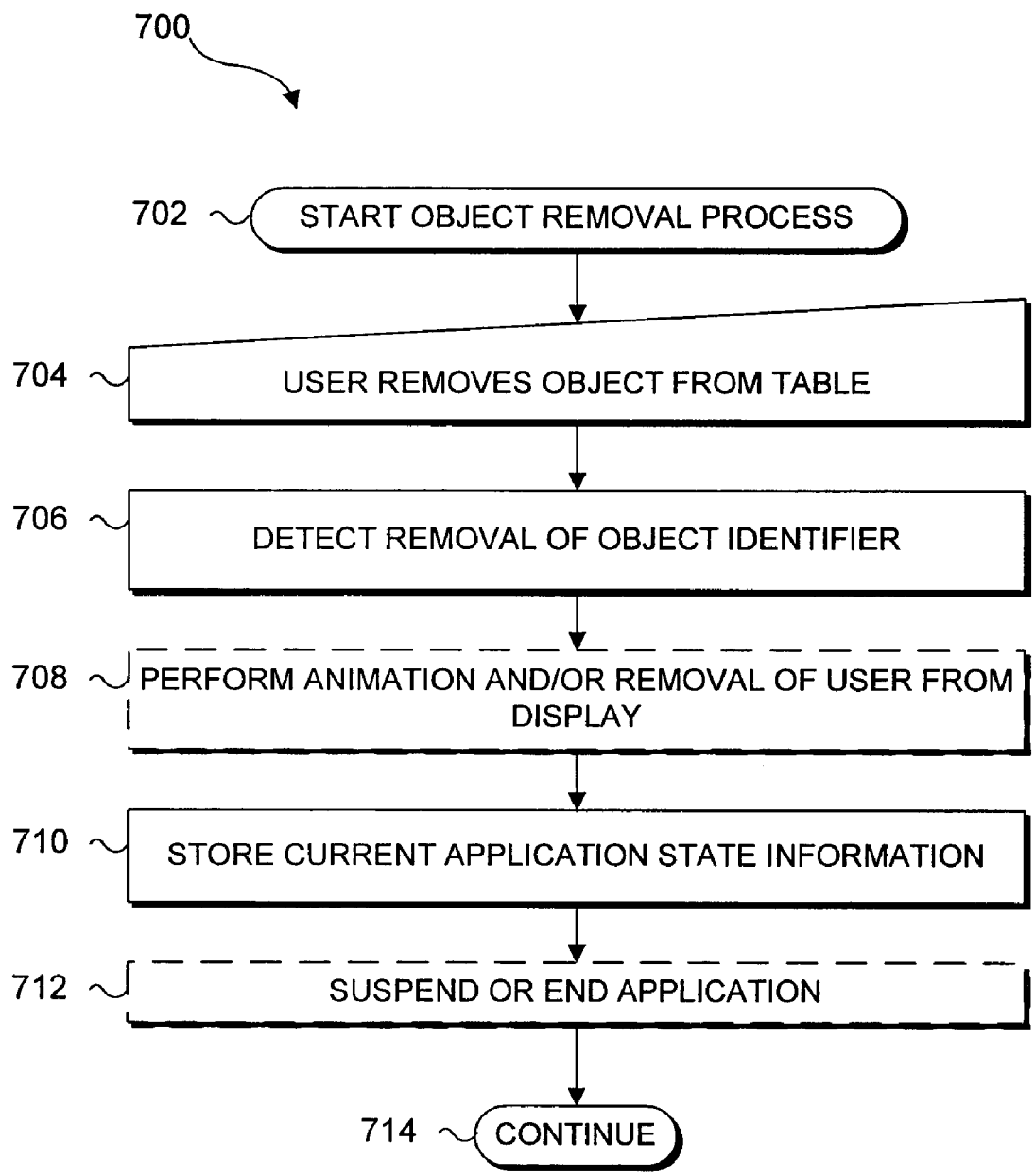
FIG. 7 is a flow diagram illustrating the logical steps for associating state information with an identifying characteristic borne by a physical object when the physical object is removed from an interactive display surface.

FIG. 7 illustrates an exemplary routine 700 for responding to removal of a physical object presenting an IR-readable identifier from the interactive display surface. In exemplary routine 700, state information for the current state of an executing application is automatically stored and associated with the IR-readable identifier when the physical object is removed from the interactive display surface. Routine 700 thus provides a quick, shorthand process for saving and associating a current state of an application. However, embodiments of the present invention also can associate state information with an identifier upon the user actuating a physical or virtual button, performing a predetermined gesture, or an equivalent step. For purposes of describing routine 700, it is assumed that the user (or the application designer) chooses to associate the current state information with the physical object by removing the physical object from the interactive playing surface, rather than by using any of the alternative techniques.

Routine 700 begins at a step 702. It is assumed that a physical object has been placed on the interactive display surface and, at a minimum, that the physical object is registered as described in routine 540 of FIG. 5, so that state information is associable with the identifier presented by the physical object. State information may already be associated with the identifier. If state information already is associated with the identifier and/or with the position of the identifier relative to the interactive display surface, more current state information is associated with the identifier, thereby overwriting the older state information. Alternatively, as a default, current state information will be associated with the identifier, such that it can be accessed, by placing the physical object in a new position.

At a step 704, the user removes the physical object from the interactive display surface. Next, at a step 706, removal of the identifier on the physical object is detected by the interactive display surface. At an optional step 708, to highlight or confirm removal of the physical object, in a preferred embodiment of the invention, an animation is performed and an icon representing the user associated with the identifier is removed from the environment. The animation, for purposes of securing the users' attention and to entertain, suitably involves the icon representing the withdrawn user dissipating, fading out, shrinking, exploding, or being eliminated in some other animation. The animation may be user-selectable and/or application specific.

Before, during, or after the animation/icon removal performed at step 708, at a step 710, information representing a current application state at the time the physical object was removed is stored and associated with the physical object's identifier and/or the position of the identifier upon its removal. It will be appreciated that, because the state information is associated with the identifier presented by the physical object but is not stored in the physical object, the state information may be stored and associated with the identifier presented by the physical object after the physical object has already been removed from the interactive display surface.

After the state information is stored at step 710, optionally the interactive display surface may suspend or terminate the application in a step 712. If the application is a single-user application, there is no reason for the application to continue executing. Similarly, if the application is a two-player game, or if it is a multi-player game that should not continue without the withdrawing user, there is no reason for the application to continue and the application is suspended or terminated. On the other hand, if the application is continuable without the withdrawing user, the optional step of suspending or terminating the application is skipped. The routine 700 ends at a step 714.

Retrieving State Information Involving Multiple Physical Objects

Figure 8:
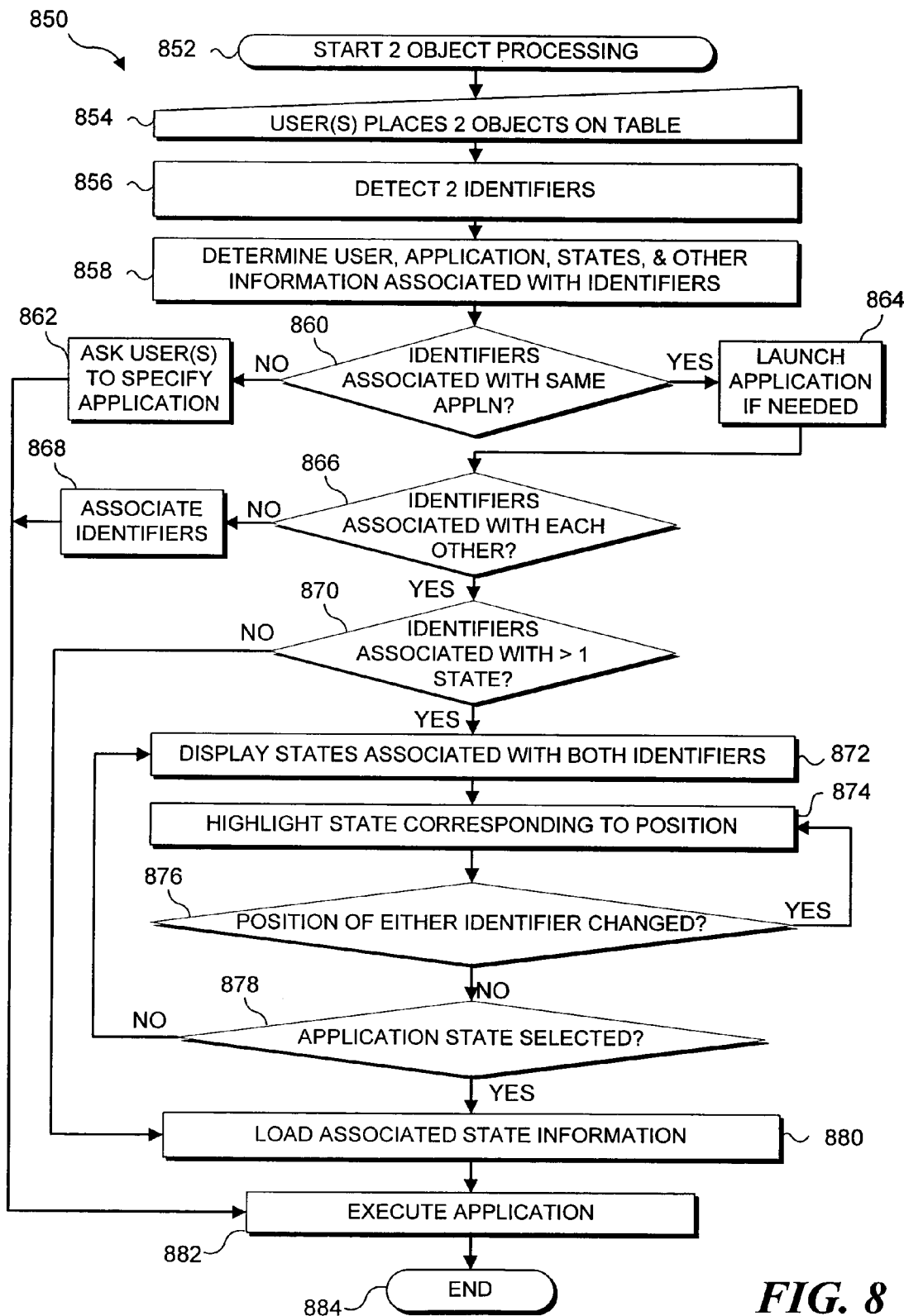
FIG. 8 is a flow diagram illustrating the logical steps for recalling information previously associated with a plurality of physical objects.

FIG. 8 illustrates an exemplary routine 850 for responding to two or more identifier-presenting physical objects being placed on the interactive display surface. Responding to the placement of two or more physical objects involves a handling of a multiplicity of associated stored states. The following description of routine 850 assumes that two physical objects are placed on the interactive display surface. However, it will be appreciated that routine 850 is adaptable to process more than two physical objects and the identifiers they present.

Routine 850 begins at a step 852. At a step 854, one or more users place two physical objects on the interactive display surface. Even if there are two physical objects, it is not necessary that there be more than one user currently at the interactive display surface. For example, if the application is a chess game, one user may wish to recreate a situation resulting from a game with another player, each of which is associated with a different one of the two physical objects in order to study possible plays, even if the other player is not currently available.

At a step 856, identifiers presented by the physical objects are detected. In a preferred embodiment of the present invention, where position of the physical objects including their location and/or orientation represent state information, the position of the physical objects also is detected to fully determine the state information that is associated with the present placement of the physical objects on the interactive display surface. At a step 858, from the detected identifier and position information, associated information regarding users, applications, application states, and other information is retrieved from local storage or over a network, from a server associated with the interactive display surface.

At a decision step 860, it is determined if the identifiers presented by the physical objects are each associated with one application. If not, there will be no state information retrievable for a common application. The identifiers may be later associated with state information for a common application, but no coherent state information is retrievable for the combination of both identifiers. Alternatively, both identifiers might be associated with multiple common applications, and it therefore cannot be assumed which application the users desire to execute. Accordingly, at a step 862, the user or users are asked to specify the application to be executed. Once the application is specified at step 862, routine 850 then proceeds to a step 882, where the application is executed.

On the other hand, if it is determined at decision step 860 that the identifiers are associated with one common application, at a step 864, the application is launched (if not already running).

At a decision step 866, it is determined if the two identifiers are associated with each other such that there might be common state information associated with both identifiers. If not, at a step 868, the identifiers are associated with each other for purpose of subsequently associating state information that is common with the identifiers. At step 882, the application is then executed. However, if it is determined that the identifiers are associated with each other, at a decision step 870, it is determined if the identifiers are associated with more than one common state. If not, routine 850 proceeds to a step 880 where the state information for the one state commonly associated with the identifiers is loaded. Once the state information is loaded at step 880, at step 882 the application is executed.

By contrast, if it is determined that more than one state is commonly associated with the identifiers, at a step 872, the states associated with both identifiers are displayed so that the users may select a desired state. For example, as shown in illustration 130 of FIG. 4C, a number of state indicators 115a-115c are generated and displayed to indicate the associated states that are available to be recalled for the users. Although illustration 130 only shows state numbers, it should be appreciated that other state-identifying information, such as state names, representative icons, dates and/or times of association, and/or a view of the associated state information are suitably presented to facilitate the user's choice of state, as described above. At a step 874, a currently selected state indicator is highlighted. For example, in illustration 130 of FIG. 4C, state indicator 115b is highlighted to correspond with the position of physical objects 132a and 132b in indicating a desired state.

Also as previously described, one of a number of available states are selectable by moving one or both of the physical objects associated with the state information. Thus, at a decision step 876, it is determined if a position of either of the identifier-presenting physical objects has been moved. If so, routine 850 loops to step 874, where the state indicator corresponding with the presently selected state is indicated.

At decision step 876, if it is determined that the position of either identifier has not changed, at a decision step 878, it is determined if a state has been selected. As previously described, a state may be selected by actuating a physical button on the physical object or on the interactive display surface, by selecting a virtual button generated by the interactive display surface, by making a predefined gesture with the physical object relative to the interactive display surface, or in another appropriate way. If it is determined at decision step 878 that a state has not been selected, routine 850 loops to step 872 where the list of associated states continues to be displayed. On the other hand, if it is determined at decision step 878 that a state has been selected, routine 850 proceeds to step 880, where data associated with the state are loaded. Once data associated with the state are loaded at step 880, at step 882, the application commences execution at the selected state with the associated state data. Routine 850 then ends at a step 884.

Although the present invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for associating a state of a computer application with a physical object on an interactive display surface of a computer system, the method comprising the steps of:
    (a) identifying the physical object based upon a characteristic of the physical object that is detectable when the physical object is disposed adjacent to the interactive display surface and by at least determining a position of the physical object relative to the interactive display surface and with the use of infrared light;
    (b) receiving an indication to save the state of the computer application;
    (c) storing attributes representative of the state in data storage not contained in the physical object; and
    (d) associating the attributes representative of the state with the characteristic of the physical object, and thus, with the physical object.

2. The method of claim 1, wherein the characteristic includes a light reflective identification disposed on a surface of the physical object.

3. The method of claim 1, wherein the step of identifying the physical object includes the steps of:
    (a) transmitting infrared light through the interactive display surface toward a face of the interactive display surface adjacent to which the physical object is disposed; and
    (b) recognizing the light reflective identification disposed on the surface of the physical object by imaging infrared light reflected thereby.

4. The method of claim 1, further comprising:
    associating the attributes representative of the state with the characteristic of the physical object and the position of the physical object.

5. The method of claim 4, wherein the position of the physical object includes at least one of a location of the physical object on the interactive display surface, and an orientation of the physical object relative to the interactive display surface.

6. The method of claim 4, further comprising the steps of:
   (a) detecting a change in the position of the physical object relative to the interactive display surface; and
   (b) associating the attributes representative of the state with the characteristic of the physical object and the change in position of the physical object.

7. The method of claim 6, wherein the change in the position of the physical object includes at least one of a rotation of the physical object, a translation of the physical object across the interactive display surface, and a movement of the physical object transverse to the interactive display surface.

8. The method of claim 1, further comprising the step of determining that the state is to be associated with the characteristic and with the physical object by determining whether the physical object is located within a region of the interactive display surface designated for state association with the physical object.

9. The method of claim 1, wherein the indication to store the state includes one of a command presented by a user, and a process initiated by the computer system.

10. The method of claim 9, wherein the command is presented by the user by carrying out one of the steps of:
    (a) actuating a physical button on the physical object causing a save command identifier to be presented to the computing system;
    (b) actuating a physical button on the computing system;
    (c) selecting a virtual button presented on the interactive display surface;
    (d) moving the physical object in a predefined save pattern;
    (e) making a gesture associated with the save command adjacent to the interactive display surface, so that the gesture is detected thereby; and
    (f) removing the physical object from a position adjacent to the interactive display surface.

11. The method of claim 1, wherein the data storage storing the attributes representative of the state is located in at least one of:
    (a) a local storage device directly coupled with the computer system; and
    (b) a remote storage device coupled with the computer system over a network.

12. The method of claim 1, further comprising the steps of:
    (a) reading a second characteristic associated with a second physical object when the second physical object is disposed adjacent to the interactive display surface; and
    (b) associating the attributes representative of the state with both the characteristic associated with the physical object and the second characteristic associated with the second physical object, and thus with both physical objects.

13. The method of claim 12, further comprising the steps of:
    (a) determining a position of the physical object relative to the interactive display surface;
    (b) determining a position of the second physical object relative to the interactive display surface; and
    (c) associating the attributes representative of the state with the characteristic, the position of the first physical object, the second characteristic, and the position of the second physical object.

14. The method of claim 13, wherein the physical object is associated with a first user of a multi-user application, and the second physical object is associated with a second user of the multi-user application, the state comprising a common state of interaction with the multi-user application by the first user and by the second user.

15. The method of claim 13, wherein the state is associated with the characteristic and the position of the second physical object indicates a variation in the state associated with the characteristic.

16. The method of claim 15, further comprising detecting a change in the position of the second physical object relative to the interactive display surface such that the change in position of the second physical object indicates a variation in the state.

17. The method of claim 1, further comprising the steps of:
    (a) identifying the physical object based upon the characteristic of the physical object, when the physical object is again disposed adjacent to the interactive display surface;
    (b) receiving an indication to retrieve the state;
    (c) retrieving the attributes representative of the state associated with the characteristic; and
    (d) processing the attributes to recreate the state.

18. The method of claim 17, further comprising the steps of:
    (a) detecting a position of the physical object when again disposed adjacent to the interactive display surface;
    (b) presenting a plurality of states associated with both the physical object and each position of the physical object relative to the interactive display surface; and
    (c) enabling a user to select one of the plurality of states.

19. The method of claim 18, wherein the plurality of states is presented by at least one of the steps of:
    (a) presenting numbers assigned to the plurality of states;
    (b) presenting names assigned to the plurality of states;
    (c) presenting icons assigned to the plurality of states; and
    (d) further comprising the step of presenting a view of the selected state when a selection is made by the user.

20. The method of claim 1, wherein the physical object has a plurality of different characteristics associated with it, each different characteristic being associated with a different face of the physical object such that any of the plurality of characteristics is selectively presented to interactive display surface by disposing the face presenting a chosen characteristic adjacent to the interactive display surface, enabling each face of the physical object to associated with a different state of the computer application.

21. A memory medium having machine executable instructions stored for carrying out the steps of claim 1.

22. A method for using a physical object to retrieve a state of an application running on a computer system that is coupled to an interactive display surface, the method comprising the steps of:
    (a) reading a characteristic presented by the physical object upon detecting the physical object is disposed adjacent to the interactive display surface and by at least determining a position of the physical object relative to the interactive display surface with the use of infrared light, said characteristic and thus, said physical object being associated with attributes representative of a state of the application, said attributes having previously been stored by the computer system;
    (b) receiving an indication to retrieve the state of the application that was previously stored;
    (c) retrieving the attributes representative of the state associated with the characteristic and with the physical object from a storage device not contained in the physical object; and
    (d) processing the attributes to recreate the state of the application.

23. The method of claim 22, wherein the characteristic includes an infrared-reflective marking disposed on a surface of the physical object.

24. The method of claim 23, wherein step of reading the characteristic includes the steps of:
   (a) transmitting infrared light through the interactive display surface toward a face of the interactive display surface adjacent to which the physical object is disposed; and
   (b) recognizing the characteristic presented by the physical object by detecting infrared light reflected by the characteristic presented by the physical object.

25. The method of claim 22, further comprising the steps of:
   (a) reading the position of the characteristic relative to the interactive display surface when the physical object is disposed adjacent to the interactive display surface;
   (b) presenting a plurality of states, each state being associated with both the characteristic and one of a plurality of positions of the characteristic on the interactive display surface;
   (c) determining a selected state from among the plurality of states, based upon the position in which the characteristic was read;
   (d) receiving an indication to retrieve the selected state;
   (e) retrieving attributes defining the selected state associated with the characteristic and the position of the characteristic; and
   (f) recreating the state based upon the attributes that were retrieved.

26. The method of claim 25, wherein the plurality of states is presented by at least one of the steps of:
   (a) presenting numbers assigned to the plurality of states;
   (b) presenting names assigned to the plurality of states;
   (c) presenting icons assigned to the plurality of states; and
   (d) enabling a user to select the selected state by choosing one of the numbers, the names, and the icons, further comprising the step of presenting a view of the selected state once the selected state is chosen by the user.

27. The method of claim 25, wherein the position of the characteristic includes at least one of a location of the physical object and an orientation of the physical object.

28. The method of claim 27, further comprising the steps of:
   (a) detecting a change in the position of the physical object relative to the interactive display surface; and
   (b) associating the attributes representative of the state with the characteristic of the physical object and the change in position of the physical object.

29. The method of claim 28, wherein the change in the position of the physical object includes at least one of a rotation of the physical object, a translation of the physical object across the interactive display surface, and a movement of the physical object transverse to the interactive display surface.

30. The method of claim 22, further comprising the step of determining that the physical object is associated with the attributes defined the state by determining whether the physical object is located within a region of the interactive display surface designated for state association with the physical object.

31. The method of claim 22, wherein the indication to retrieve the state includes one of a command presented by a user and a process initiated by the computer system.

32. The method of claim 31, wherein the command is presented by the user by carrying one of the steps of:
   (a) actuating a physical button on the physical object, causing a save command identifier to be presented to and detected using the interactive display moving the physical object in a predefined retrieve pattern; and making a gesture detected using the interactive display surface that is associated with a retrieve command. surface;
   (b) actuating a physical button on the computing system;
   (c) selecting a virtual button presented on the interactive display surface;
   (d) moving the physical object in a predefined retrieve pattern; and
   (e) making a gesture detected using the interactive display surface that is associated with a retrieve command.

33. The method of claim 22, wherein the data storage storing the attributes representative of the state are located in at least one of:
   (a) a local storage device directly coupled with the computer system; and
   (b) a remote storage device accessible by the computer system.

34. The method of claim 22, further comprising the steps of:
   (a) reading a second characteristic presented by a second physical object when the second physical object is disposed adjacent to the interactive display surface, said second characteristic and said second physical object having been previously associated with the attributes representative of the state; and
   (b) retrieving the attributes representative of the state that are associated with a combination of the characteristic and the second characteristic.

35. The method of claim 34, further comprising:
   (a) determining a position of the characteristic relative to the interactive display surface;
   (b) determining a position of the second characteristic relative to the interactive display surface; and
   (c) retrieving the attributes representative of the state based upon the characteristic, the position of the characteristic, the second characteristic, and the position of the second characteristic.

36. The method of claim 34, wherein the physical object is associated with a first user of a multi-user application, and the second physical object is associated with a second user of the multi-user application, the state comprising a common state of interaction with the multi-user application by the first user and by the second user.

37. The method of claim 35, wherein the state is associated with the characteristic and the position of the second physical object indicates a variation in the state associated with the characteristic.

38. The method of claim 37, further comprising detecting a change in the position of the second physical object relative to the interactive display surface such that the change in position of the second physical object indicates a variation in the state.

39. A memory medium having machine instructions for carrying out the steps of claim 22.

40. A method for associating a state of a computer application with a physical object on an interactive display surface of a computer system, the method comprising the steps of:
   identifying the physical object based upon a characteristic of the physical object that is detectable when the physical object is disposed adjacent to the interactive display surface;
   receiving an indication to save the state of the computer application;
   storing attributes representative of the state in data storage not contained in the physical object;

associating the attributes representative of the state with the characteristic of the physical object, and thus, with the physical object;

reading a second characteristic associated with a second physical object when the second physical object is disposed adjacent to the interactive display surface; and associating the attributes representative of the state with both the characteristic associated with the physical object and the second characteristic associated with the second physical object, and thus with both physical objects.

* * * * *